United States Patent
Henry

(10) Patent No.: US 12,410,768 B2
(45) Date of Patent: Sep. 9, 2025

(54) WAVE POWER DEVICE

(71) Applicant: Philip Henry, Cortland, NY (US)

(72) Inventor: Philip Henry, Cortland, NY (US)

(*) Notice: Subject to any disclaimer, the term of this patent is extended or adjusted under 35 U.S.C. 154(b) by 0 days.

(21) Appl. No.: 18/775,062

(22) Filed: Jul. 17, 2024

(65) Prior Publication Data
US 2025/0237189 A1 Jul. 24, 2025

Related U.S. Application Data

(60) Provisional application No. 63/623,888, filed on Jan. 23, 2024.

(51) Int. Cl.
F03B 13/24 (2006.01)

(52) U.S. Cl.
CPC ........ *F03B 13/24* (2013.01); *F05B 2220/706* (2013.01)

(58) Field of Classification Search
CPC ........ F03B 13/24; F03B 13/18; F03B 13/142; F05B 2220/706; Y02E 10/30
See application file for complete search history.

(56) References Cited

U.S. PATENT DOCUMENTS

| | | | |
|---|---|---|---|
| 4,281,257 A | 7/1981 | Testa | |
| 5,708,305 A | 1/1998 | Wolfe | |
| 7,199,481 B2 | 4/2007 | Hirsch | |
| 8,308,449 B2 | 11/2012 | Smith | |
| 11,333,124 B2 | 5/2022 | von Bulow | |
| 2003/0155775 A1 | 8/2003 | Camp | |
| 2018/0111665 A1* | 4/2018 | Tsao | F03B 17/06 |
| 2023/0417213 A1* | 12/2023 | Little | F03B 13/24 |

* cited by examiner

*Primary Examiner* — Joseph Ortega
(74) *Attorney, Agent, or Firm* — Brennan, Manna & Diamond, LLC

(57) ABSTRACT

A wave power device is disclosed for extracting power from water waves and converting it into clean renewable electricity. The wave power device is comprised of three parts. The first part comprises a set of wave collection tubes. The two wave collection tubes are placed in parallel to the advancing wave front and adjacent to each other and offset by one half of a wavelength. The alternating pressure of the waves is converted into an alternating airflow. The second part comprises a rectifier, wherein the rectifier is a system of check valves that turn the alternating airflow output of the collecting tubes into linear flow. The third part comprises a turbine and a generator, wherein the airflow from the rectifier is fed to the turbine which in turn, rotates the generator to produce electricity.

13 Claims, 6 Drawing Sheets

WAVE POWER DEVICE

CROSS-REFERENCE TO RELATED APPLICATION

The present application claims priority to, and the benefit of, U.S. Provisional Application No. 63/623,888, which was filed on Jan. 23, 2024, and is incorporated herein by reference in its entirety.

FIELD OF THE INVENTION

The present invention relates generally to the field of wave power devices. More specifically, the present invention relates to a system for extracting power from water waves and converting it into clean, renewable electricity. Accordingly, the present disclosure makes specific reference thereto. Nonetheless, it is to be appreciated that aspects of the present invention are also equally applicable to other like applications, devices, and methods of manufacture.

BACKGROUND

By way of background, this invention relates to improvements in wave power devices. Generally, conventional electric power generation sources can cause harm to the environment through pollution. Further, fossil fuels are a non-renewable resource, and people are looking for more sustainable choices. Additionally, clean, renewable electricity is important for any community and will inevitably help the planet in the long term.

With the ever-increasing need of industrialized nations for power, and with the increasing problems posed by conventional sources of power, the development of new power sources is becoming of critical importance. One such power source is that represented by ocean waves. Wave power is clean, safe, and permanent. Certainly, then, wave power potentially could be quite important as a power source. Yet, while there is an increasing interest in this potential source of power, few practical systems presently exist to extract any significant amount of power from the ocean's waves.

Accordingly, there is a demand for an improved wave power device that provides users with a system for extracting power from water waves and converting it into clean, renewable electricity. More particularly, there is a demand for a wave power device that eliminates the damage done to the environment by preventing the extraction of fossil and nuclear fuel that creates pollution.

Therefore, there exists a long-felt need in the art for a wave power device that provides users with a system for extracting power from water waves and converting it into clean, renewable electricity. There is also a long-felt need in the art for a wave power device that features two tubes placed parallel to the advancing wave front, adjacent to one another, and offset by one half of the wavelength, designed to alternate pressure between waves and convert it into airflow. Further, there is a long-felt need in the art for a wave power device that includes a rectifier, a turbine, and a generator that converts the airflow into renewable electricity. Moreover, there is a long-felt need in the art for a device that eliminates damage done to the environment by preventing the extraction of fossil and nuclear fuel that creates pollution. Further, there is a long-felt need in the art for a wave power device that sends airflow to the turbine which in turn rotates the generator to produce electricity. Finally, there is a long-felt need in the art for a wave power device that comprises wave collection tubes, wherein each tube's diameter will be matched to the maximum expected wave amplitude at its location.

The subject matter disclosed and claimed herein, in one embodiment thereof, comprises a wave power device. The device is a system for extracting power from water waves and converting it into clean renewable electricity. The wave power device is comprised of three parts. The first part comprises a set of wave collection tubes. The two wave collection tubes are placed in parallel to the advancing wave front and adjacent to each other and offset by one half of a wavelength. The alternating pressure of the waves is converted into an alternating airflow. The second part comprises a rectifier, wherein the rectifier is a system of check valves that turn the alternating airflow output of the collecting tubes into linear flow. The third part comprises a turbine and a generator, wherein the airflow from the rectifier is fed to the turbine which in turn, rotates the generator to produce electricity.

Furthermore, each wave collection tube's diameter is matched to the maximum expected wave amplitude at its location. Its length will depend on the system's piping to conduct air away from and back to the collection tube. Each wave collection tube will be as long as practical, perhaps 100 meters or more. The airflow is conducted from and to the tubes to a rectifier, which converts the sinusoidal movement of the waves to linear flow. The rectifier will be composed of check (non-return valves) and piping in the pattern of its electrical equivalent. The linear output from the high-pressure side of the rectifier will be piped to the input of a turbine. After passing through the turbine, the air will be piped to the low-pressure side of the rectifier.

In this manner, the wave power device of the present invention accomplishes all of the foregoing objectives and provides users with a device that extracts power from water waves and converts it into clean, renewable electricity. The device is a set of wave collection tubes, along with a rectifier, a turbine, and a generator. The device converts the airflow within the tubes into renewable electricity.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a wave power device. The device is a system for extracting power from water waves and converting it into clean renewable electricity. The wave power device is comprised of three parts. The first part comprises a set of wave collection tubes. The two wave collection tubes are placed parallel to the advancing wave front and adjacent to each other, and offset by one half of a wavelength. The alternating pressure of the waves is converted into an alternating airflow. The second part comprises a rectifier, wherein the rectifier is a system of check valves that turn the alternating airflow output of the collecting tubes into linear flow. The third part comprises a turbine and a generator, wherein the airflow from the rectifier is fed to the turbine which in turn, rotates the generator to produce electricity.

In one embodiment, the wave power device comprises a set of wave collection tubes. Generally, there are two wave collection tubes in use with the device, but any suitable number of wave collection tubes can be utilized as is known in the art. Typically, the wave collection tubes are tethered to the ocean bottom.

In one embodiment, the set of wave collection tubes are anchored to the bottom of the body of water, such as the sea floor, or the like, by a mooring means which includes an anchor and a tether chain. In one embodiment, the tether chain is attached to an exterior surface of the wave collection tubes by an attaching means or the like. The tether chain permits some play or floating motion of the wave collection tubes to prevent damage or swamping thereof. A weight or other anchor means can be attached to the lowermost part of the wave collection tubes. Further, the set of wave collection tubes are partially or totally immersed in the water and are weighted and balanced to remain horizontal in the water. The wave collection tubes are typically cylindrical in shape, with an exterior surface closed on both ends, and an open interior accessed by holes in the bottom, which permits the influx of water into and the egress of water out of the tubes. Typically, the two wave collection tubes are placed in parallel to the advancing wave front and adjacent to each other and offset by one half of a wavelength. Furthermore, each wave collection tube's diameter is matched to the maximum expected wave amplitude at its location. Its length will depend on the device's piping to conduct air away from and back to the collection tube. Thus, each wave collection tube will be as long as practical, perhaps 100 meters or more, or any other suitable length as is known in the art.

In one embodiment, the wave collection tubes disclosed herein are selected so that the first wave collection tube is closely adjacent a wave, or preferably a wave crest, while the second wave collection tube is closely adjacent a wave valley or trough, and preferably located in such valley or trough. Such spacing will provide an optimum pressure and liquid level height differential for the device. As a wave passes the wave collection tubes, the water level within the wave collection tubes rises and falls according to whether a crest or a valley is passing the wave collection tubes. Further, the air pressure within the wave collection tubes varies according to the level of water in the wave collection tubes due to the open interior thereof. Accordingly, water enters through the interior of the wave collection tubes, and the alternating pressure of the waves is converted into an alternating airflow.

In one embodiment, the wave power device comprises a rectifier. The rectifier comprises a plurality of check valves that turn the alternating airflow output of the wave collection tubes into linear flow. Specifically, the rectifier will be composed of check valves (i.e., non-return valves), that allow for the piping in the pattern of its electrical equivalent. Specifically, the linear output from the high-pressure side of the rectifier is piped to the input of the turbine. After passing through the turbine, the air will be piped to the low-pressure side of the rectifier. Thus, the rectifier comprises one-way valves mounted therein to control and regulate airflow into the inlet and outlet of the turbine. Typically, the rectifier is connected to the turbine at or near the height of the rotor shaft, with the turbine to direct flow against the rotor blades in a manner used in impulse turbines.

In one embodiment, the water power device comprises a turbine in communication with a generator to produce electricity. The turbine is typically fixedly mounted either within the device or on shore and comprises a high-pressure inlet for accepting airflow from the rectifier and a low-pressure outlet for expelling the air back to the rectifier. Accordingly, the linear output from the high-pressure side of the rectifier is piped to the input (i.e., high-pressure inlet) of the turbine. After passing through the turbine, the air will be piped to the low-pressure side of the rectifier. Further, the turbine includes a turbine casing and a turbine rotor rotatably mounted within the casing and having a multiplicity of rotor blades mounted on a rotor shaft. Thus, the airflow is then passed through the turbine to drive the turbine's shaft. Further, the rotor shaft is connected to an energy generator, such as an electrical generator or the like, to translate the rotary motion of the rotor shaft into usable energy such as electrical or mechanical energy. Generally, air is constantly flowing through the turbine as a wave front passes by the device. The wave power device is thus generating power in an essentially constant and uninterrupted manner.

In one embodiment, the wave power device comprises an impact absorber component, associated with the wave collection tubes to absorb impact and prevent damage to the wave collection tubes in the event a wave having an unusually large height passes by the device. The movement of the wave collection tubes is controlled by wave height, and thus, the impact absorber component can help protect the device, as needed.

The operation of the wave power device is as follows.

In one embodiment, FIG. 2 is a diagram of the situation where the wave's crest is advancing over the first wave collection tube and the wave's trough is advancing over the second wave collection tube. In this figure, the wave crest is advancing over the first wave collection tube, forcing air from the tube into the rectifier. Simultaneously, the wave trough is advancing over the second wave collection tube, pulling the air from the rectifier into the tube. The rectifier converts the sinusoidal motion (alternating current) of the wave into a rectified sine wave motion. The smoothing tanks refine that motion into linear motion (direct current). This flow is then passed through the turbine to drive the turbine's shaft, which in turn rotates the generator to produce electricity. In this figure, the first and second wave collection tubes are offset by one half of a wavelength.

In one embodiment, FIG. 3 is a diagram of the situation where the wave's crest is advancing over the second wave collection tube and the wave's trough is advancing over the first wave collection tube. In this figure, the wave crest is advancing over the second wave collection tube, forcing air from the tube into the rectifier. Simultaneously, the wave trough is advancing over the first wave collection tube, pulling the air from the rectifier into the tube. The rectifier converts the sinusoidal motion (alternating current) of the wave into a rectified sine wave motion. The blocked portions of the tubes act as smoothing tanks that refine the motion into linear motion (direct current). This flow is passed through the turbine to drive the turbine's shaft, which in turn rotates the generator to produce electricity. In this figure, the first and second wave collection tubes are offset by one half of a wavelength.

In one embodiment, FIG. 4 is a diagram of the wave progression. Specifically, as the wave progresses, its crest advances over the first wave collection tube, entering the tube's underside and forcing the air within it out the upper side, through the non-return valve, and to the turbine's high-pressure inlet. At the same time, its trough advances over the second wave collection tube, withdrawing the water from the tube's underside and creating a suction that pulls air from the turbine's low-pressure outlet, through the non-return valve, and into the air into the upper side. As the wave continues to progress, the process reverses, with air being drawn into the first wave collection tube and being forced out of the second wave collection tube. Successive waves continue this push-pull process, creating an alternating current of airflow. This flow is passed through a rectifier, creating a linear flow through two pipes, one leading into a turbine and the other removing air from the turbine. The linear flow through the turbine, in turn, rotates the generator to produce electricity. In this figure, the first and second wave collection tubes are offset by one half of a wavelength.

In one embodiment, FIG. 5 is a diagram of the end view of the first wave collection tube. In the wave crest phase, water holes connect the first wave collection tube to the ocean. Water goes in the first wave collection tube. Specifically, the oncoming wave crest enters the bottom of the first wave collection tube, forcing the air in the tube out the top. Then, air goes out of the first wave collection tube. Specifically, the air in the first wave collection tube is forced by the in-rushing wave water from the wave crest out the top of the tube and through the air pipe, and to the turbine. Further, the air output pipe connects the first wave collection tube to the turbine's high-pressure side.

In the water trough phase, water goes out of the first wave collection tube. Specifically, the water is withdrawn from the first wave collection tube into the trough of the oncoming wave, sucking the air from the rectifier into the tube. Then, air enters into the first wave collection tube. Specifically, the air is drawn from the turbine through the air pipe into the first wave collection tube by the suction created by the exit of the wave water through the tube's bottom into the trough of the wave. Further, an air input pipe connects the first wave collection tube to the turbine's low-pressure side.

In yet another embodiment, the wave power device comprises a plurality of indicia.

In yet another embodiment, a method of extracting power from water waves and converting it into clean renewable electricity is disclosed. The method includes the steps of providing a set of wave collection tubes in communication with a rectifier, a turbine, and a generator. The method also comprises positioning the set of wave collection tubes in parallel to the advancing wave front and adjacent to each other and offset by one half of a wavelength. Further, the method comprises converting the alternating pressure of the waves into an alternating airflow. The method also comprises turning the alternating airflow output of the collection tubes into a linear flow. Finally, the method comprises feeding the airflow from the rectifier to the turbine, which in turn rotates the generator to produce electricity.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
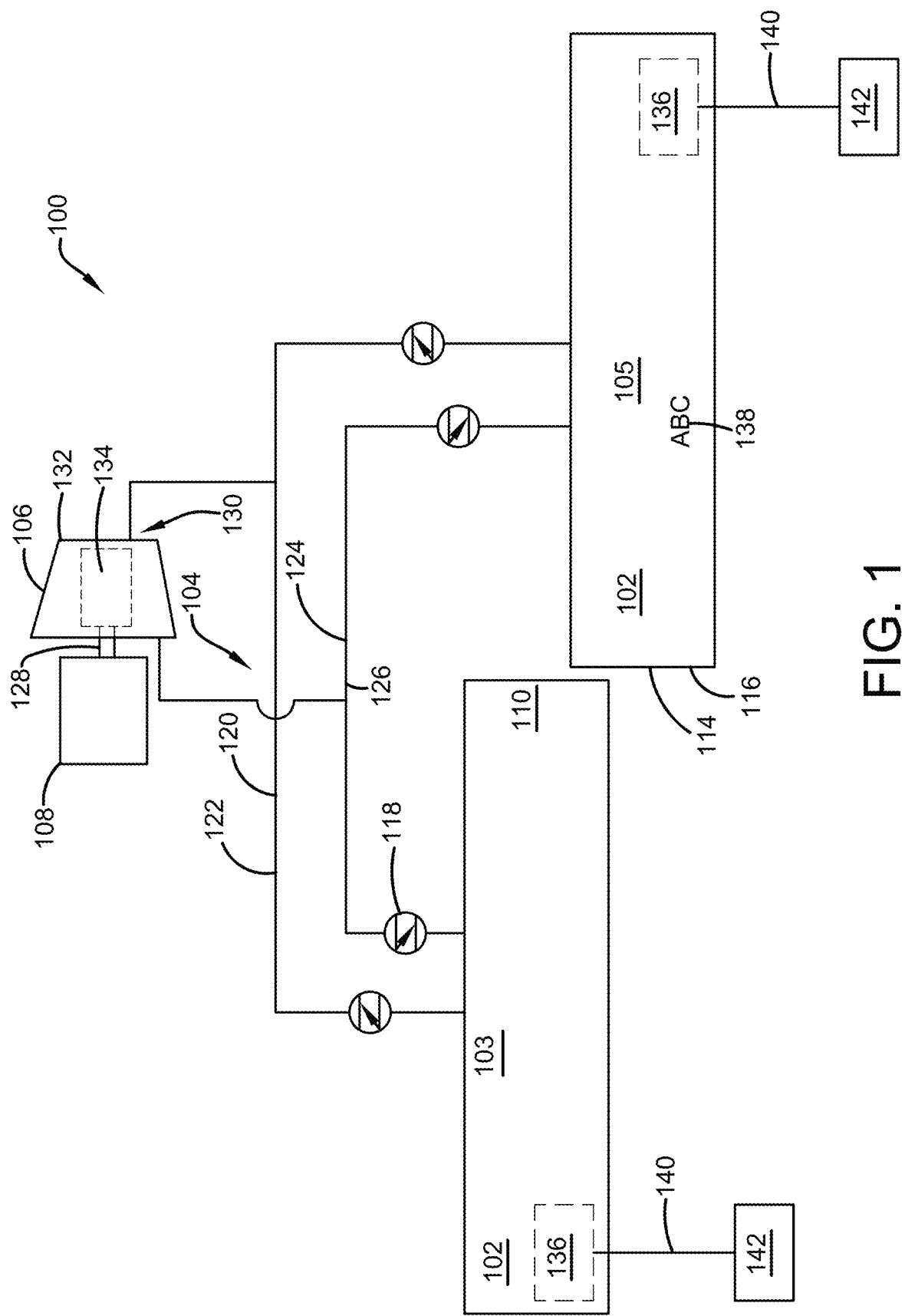
FIG. 1 illustrates a perspective view of one embodiment of the wave power device of the present invention showing how the wave collection tubes work in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a wave power device that provides users with a system for extracting power from water waves and converting it into clean, renewable electricity. There is also a long-felt need in the art for a wave power device that features two tubes placed parallel to the advancing wave front, adjacent to one another, designed to alternate pressure between waves and convert it into airflow. Further, there is a long-felt need in the art for a wave power device that includes a rectifier, a turbine, and a generator that converts the airflow into renewable electricity. Moreover, there is a long-felt need in the art for a device that eliminates damage done to the environment by preventing the extraction of fossil and nuclear fuel that creates pollution. Further, there is a long-felt need in the art for a wave power device that sends airflow to the turbine which in turn rotates the generator to produce electricity. Finally, there is a long-felt need in the art for a wave power device that comprises wave collection tubes, wherein each tube's diameter will be matched to the maximum expected wave amplitude at its location.

The present invention, in one exemplary embodiment, is a novel wave power device. The device is a system for extracting power from water waves and converting it into clean renewable electricity. The wave power device is comprised of three parts. The first part comprises a set of wave collection tubes. The two wave collection tubes are placed in parallel to the advancing wave front and adjacent to each other and offset by one half of a wavelength. The alternating pressure of the waves is converted into an alternating airflow. The second part comprises a rectifier, wherein the rectifier is a system of check valves that turn the alternating airflow output of the collecting tubes into linear flow. The third part comprises a turbine and a generator, wherein the airflow from the rectifier is fed to the turbine which in turn, rotates the generator to produce electricity. The present invention also includes a novel method of extracting power from water waves and converting it into clean renewable electricity. The method includes the steps of providing a set of wave collection tubes in communication with a rectifier, a turbine, and a generator. The method also comprises positioning the set of wave collection tubes in parallel to the advancing wave front and adjacent to each other and offset by one half of a wavelength. Further, the method comprises converting the alternating pressure of the waves into an alternating airflow. The method also comprises turning the alternating airflow output of the collection tubes into a linear flow. Finally, the method comprises feeding the airflow from the rectifier to the turbine, which in turn rotates the generator to produce electricity.

Referring initially to the drawings, FIG. 1 illustrates a perspective view of one embodiment of the wave power device 100 of the present invention. In the present embodiment, the wave power device 100 is an improved wave power device 100 that provides a user with a system for extracting power from water waves and converting it into clean renewable electricity. Specifically, the wave power device 100 comprises a set of wave collection tubes 102 with a rectifier 104, a turbine 106, and a generator 108 that converts the airflow into renewable electricity. The two wave collection tubes 102 are placed in parallel to the advancing wave front and adjacent to each other. The alternating pressure of the waves is converted into an alternating airflow. The rectifier 104 is a system of check valves that turn the alternating airflow output of the collecting tubes 102 into linear flow. Further, the airflow from the rectifier 104 is fed to the turbine 106 which in turn, rotates the generator 108 to produce electricity.

Generally, the wave power device 100 of the present invention is designed to take advantage of the motion of a water wave to generate energy using wave motion. Considering deep water waves, as the wave passes a given point, the motion of the water wave defines a circle, with the water moving forward with the wave as the wave crest passes, dropping until the trough of the wave is reached at which point the water moves in a reverse direction relative to the apparent motion of the wave crests, then rises to the next crest. As the sea bottom rises in shallow areas, this circular motion becomes somewhat flattened. Accordingly, while it is preferred that the disclosed wave power device 100 be used in deep sea conditions, the device 100 also can be used at off-shore locations.

Furthermore, the wave power device 100 comprises a set of wave collection tubes 102. Generally, there are two wave collection tubes 102 in use with the device 100, but any suitable number of wave collection tubes 102 can be utilized as is known in the art. Typically, the wave collection tubes 102 are tethered to the ocean bottom.

Additionally, the set of wave collection tubes 102 are anchored to the bottom of the body of water, such as the sea floor, or the like, by a mooring means which includes an anchor 142 and a tether chain 140. In one embodiment, the tether chain 140 is attached to an exterior surface of the wave collection tubes 102 by an attaching means or the like. The tether chain 140 permits some play or floating motion of the wave collection tubes 102 to prevent damage or swamping thereof. A weight or other anchor means 142 can be attached to the lowermost part of the wave collection tubes 102. Further, the set of wave collection tubes 102 are partially or totally immersed in the water and are weighted and balanced to remain horizontal in the water. The wave collection tubes 102 are typically cylindrical in shape, with an exterior surface 110 closed on both ends 112, and an open interior 114 accessed by holes in the bottom 116, which permits the influx of water into and the egress of water out of the tubes 102. Typically, the two wave collection tubes 102 are placed in parallel to the advancing wave front and adjacent to each other and offset by one half of a wavelength. Furthermore, each wave collection tube's diameter is matched to the maximum expected wave amplitude at its location. Its length will depend on the device's piping to conduct air away from and back to the collection tube 102. Thus, each wave collection tube 102 will be as long as practical, perhaps 100 meters or more, or any other suitable length as is known in the art.

In one embodiment, each of the two collection tubes 102 will have two anchor systems (i.e., anchor 142 and tether 140), one at each end 112 of the tubes 102. Each of those anchor systems will be equipped with two anchors 142 and tethers 140, one anchor 142 that is placed in front of the tube 102 and a second anchor 142 that is placed behind the tube 102. Each anchor 142 will have a wench 144 that can pull its tether 140 in or let it out to move its end of the tube 102. In that way, a tube 102 can be moved up or down in the water column or twisted to keep it parallel with the wave fronts, as needed.

Furthermore, the wave collection tubes 102 disclosed herein are selected so that the first wave collection tube 103 is closely adjacent a wave, or preferably a wave crest, while the second wave collection tube 105 is closely adjacent a wave valley or trough, and preferably located in such valley or trough. Such spacing will provide an optimum pressure and liquid level height differential for the device 100. As a wave passes the wave collection tubes 102, the water level within the wave collection tubes 102 rises and falls according to whether a crest or a valley is passing the wave collection tubes 102. Further, the air pressure within the wave collection tubes 102 varies according to the level of water in the wave collection tubes 102 due to the open interior 114 thereof. Accordingly, water enters through the interior 114 of the wave collection tubes 102, and the alternating pressure of the waves is converted into an alternating airflow.

Additionally, the wave power device 100 comprises a rectifier 104. The rectifier 104 comprises a plurality of check valves 118 that turn the alternating airflow output of the wave collection tubes 102 into linear flow. Specifically, the rectifier 104 will be composed of check valves 118 (i.e., non-return valves), that allow for the piping in the pattern of its electrical equivalent. Specifically, the linear output from the high-pressure side 120 of the rectifier 104 is piped to the input 122 of the turbine 106. After passing through the turbine 106, the air will be piped to the low-pressure side 124 of the rectifier 104. Thus, the rectifier 104 comprises one-way valves 118 mounted therein to control and regulate airflow into the inlet 122 and outlet 126 of the turbine 106. Typically, the rectifier 104 is connected to the turbine 106 at or near the height of the rotor shaft 128, with the turbine 106 to direct flow against the rotor blades 130 in a manner used in impulse turbines.

Further, the water power device 100 comprises a turbine 106 in communication with a generator 108 to produce electricity. The turbine 106 is typically fixedly mounted within the device 100 or on shore and comprises a high-pressure inlet 122 for accepting airflow from the rectifier 104 and a low-pressure outlet 126 for expelling the air back to the rectifier 104. Accordingly, the linear output from the high-pressure side 120 of the rectifier 104 is piped to the input 122 (i.e., high-pressure inlet) of the turbine 106. After passing through the turbine 106, the air will be piped to the low-pressure side 124 of the rectifier 104. Further, the turbine 106 includes a turbine casing 132 and a turbine rotor 134 rotatably mounted within the casing 132 and having a multiplicity of rotor blades 130 mounted on a rotor shaft 128. Thus, the airflow is then passed through the turbine 106 to drive the turbine's shaft 128. Further, the rotor shaft 128 is connected to an energy generator 108, such as an electrical generator or the like, to translate the rotary motion of the rotor shaft 128 into usable energy such as electrical or mechanical energy. Generally, air is constantly flowing through the turbine 106 as a wave front passes by the device 100. The wave power device 100 is thus generating power in an essentially constant and uninterrupted manner.

In one embodiment, the wave power device 100 comprises an impact absorber component 136, associated with the wave collection tubes 102 to absorb impact and prevent damage to the wave collection tubes 102 in the event a wave having an unusually large height passes by the device 100. Movement of the wave collection tubes 102 is controlled by wave height, and thus, the impact absorber component 136 can help protect the device 100, as needed.

In yet another embodiment, the wave power device 100 comprises a plurality of indicia 138. The wave collection tubes 102 of the device 100 may include advertising, a trademark, or other letters, designs, or characters, printed, painted, stamped, or integrated into the wave collection tubes 102, or any other indicia 138 as is known in the art. Specifically, any suitable indicia 138 as is known in the art can be included, such as, but not limited to, patterns, logos, emblems, images, symbols, designs, letters, words, characters, animals, advertisements, brands, etc., that may or may not be wave power, wave, or brand related.

The operation of the wave power device is as follows.

Figure 2:
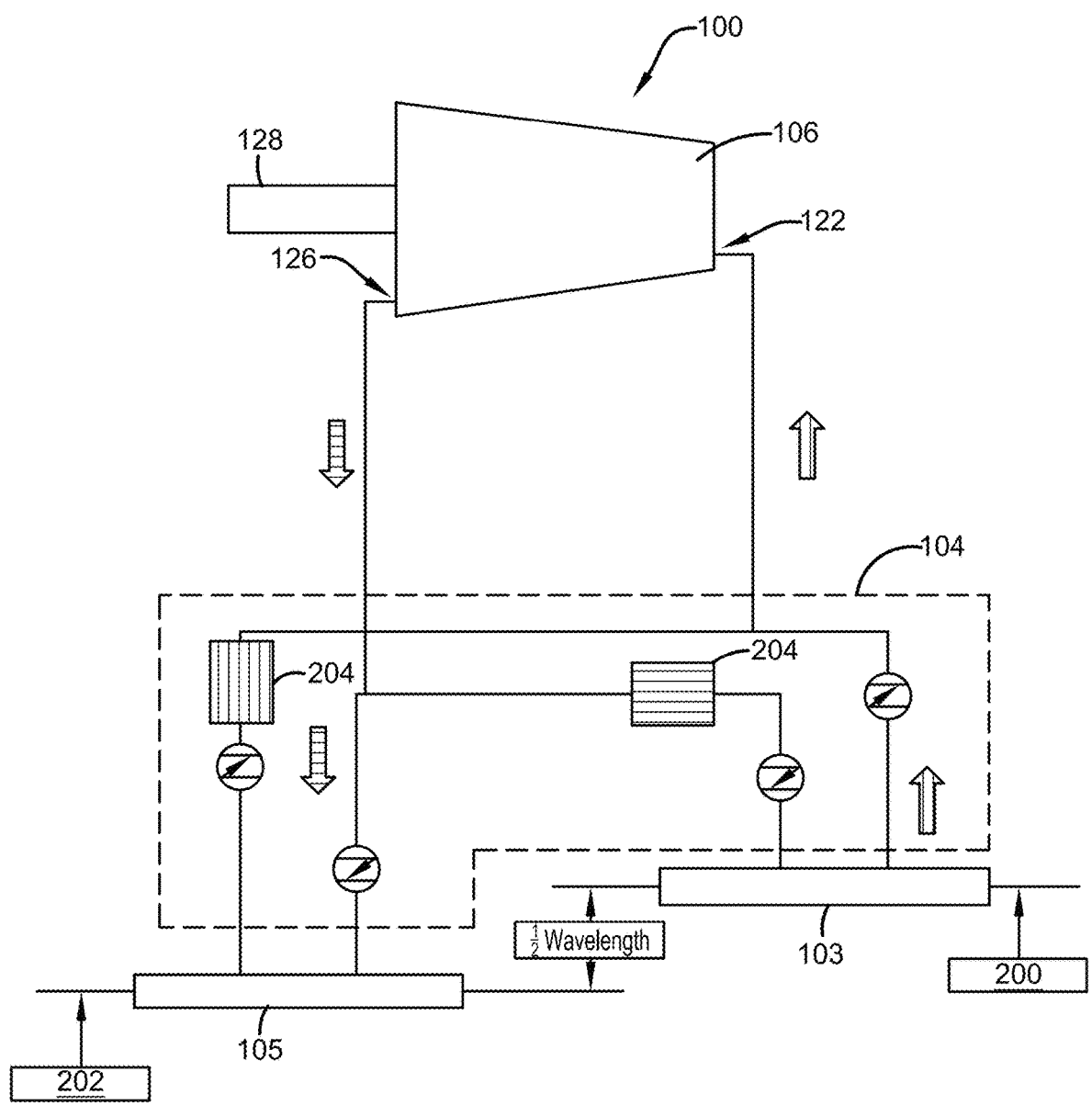
FIG. 2 illustrates a diagram of the wave power device of the present invention showing the wave's crest applied to the first wave collection tube and the wave's trough applied to the second wave collection tube in accordance with the disclosed architecture.

FIG. 2 is a diagram of the situation where the wave's crest 200 is advancing over the first wave collection tube 103 and the wave's trough 202 is advancing over the second wave collection tube 105. In this figure, the wave crest 200 is advancing over the first wave collection tube 103, forcing air from the tube 103 into the rectifier 104. Simultaneously, the wave trough 202 is advancing over the second wave collection tube 105, pulling the air from the rectifier 104 into the tube 105. The rectifier 104 converts the sinusoidal motion (alternating current) of the wave into a half sine wave motion. The smoothing tanks 204 refine that motion into linear motion (direct current). This flow is then passed through the turbine 106 to drive the turbine's shaft 128, which in turn rotates the generator 108 to produce electricity. In this figure, the first 103 and second 105 wave collection tubes are offset by one half of a wavelength.

Figure 3:
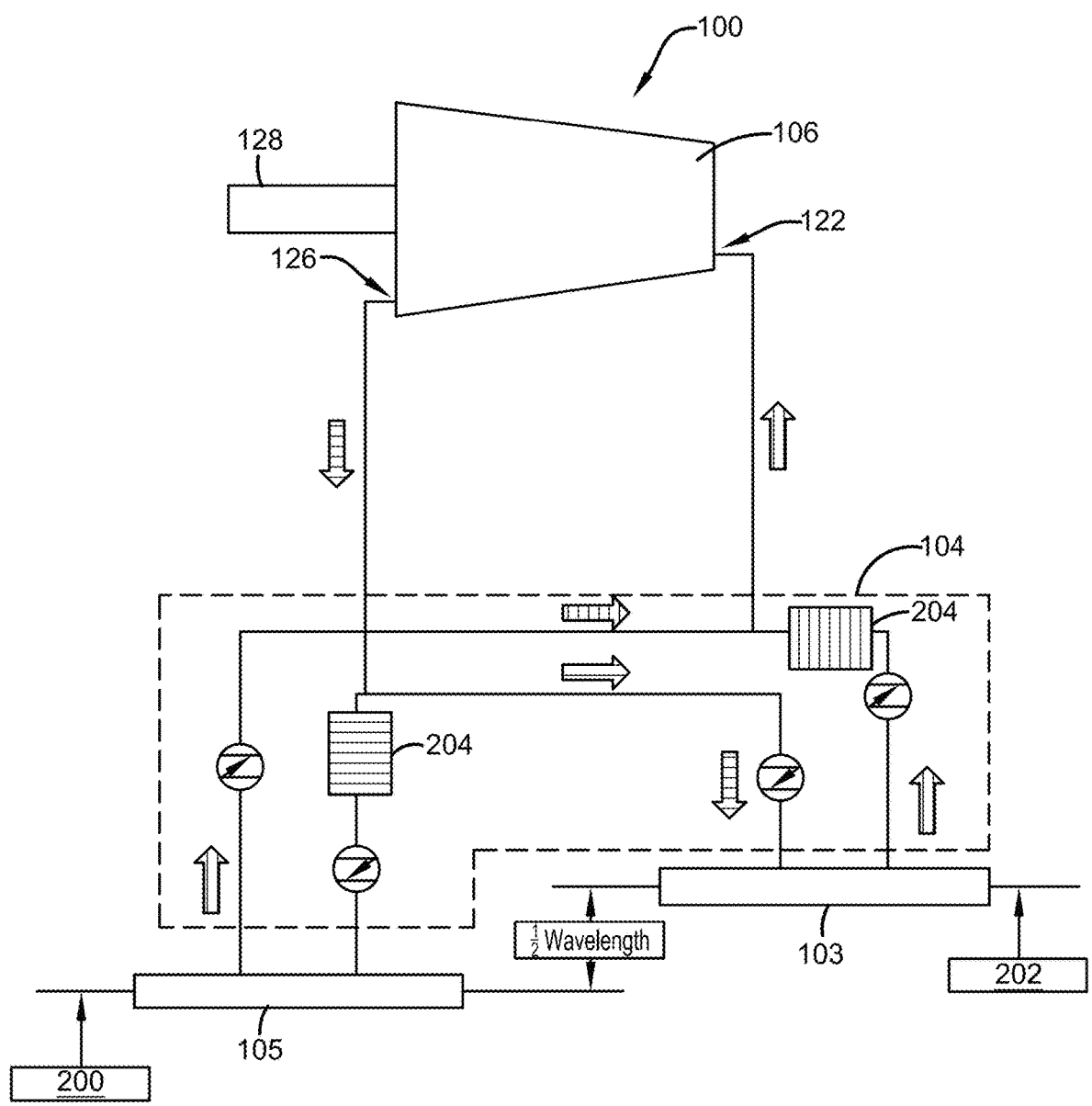
FIG. 3 illustrates a diagram of the wave power device of the present invention showing the wave's crest applied to the second wave collection tube and the wave's trough applied to the first wave collection tube in accordance with the disclosed architecture.

FIG. 3 is a diagram of the situation where the wave's crest 200 is advancing over the second wave collection tube 105 and the wave's trough 202 is advancing over the first wave collection tube 103. In this figure, the wave crest 200 is advancing over the second wave collection tube 105, forcing air from the tube 105 into the rectifier 104. Simultaneously, the wave trough 202 is advancing over the first wave collection tube 103, pulling the air from the rectifier 104 into the tube 103. The rectifier 104 converts the sinusoidal motion (alternating current) of the wave into a half sine wave motion. The blocked portions of the tubes 102 act as smoothing tanks 204 that refine the motion into linear motion (direct current). This flow is passed through the turbine 106 to drive the turbine's shaft 128, which in turn rotates the generator 108 to produce electricity. In this figure, the first 103 and second 105 wave collection tubes are offset by one half of a wavelength.

Figure 4:
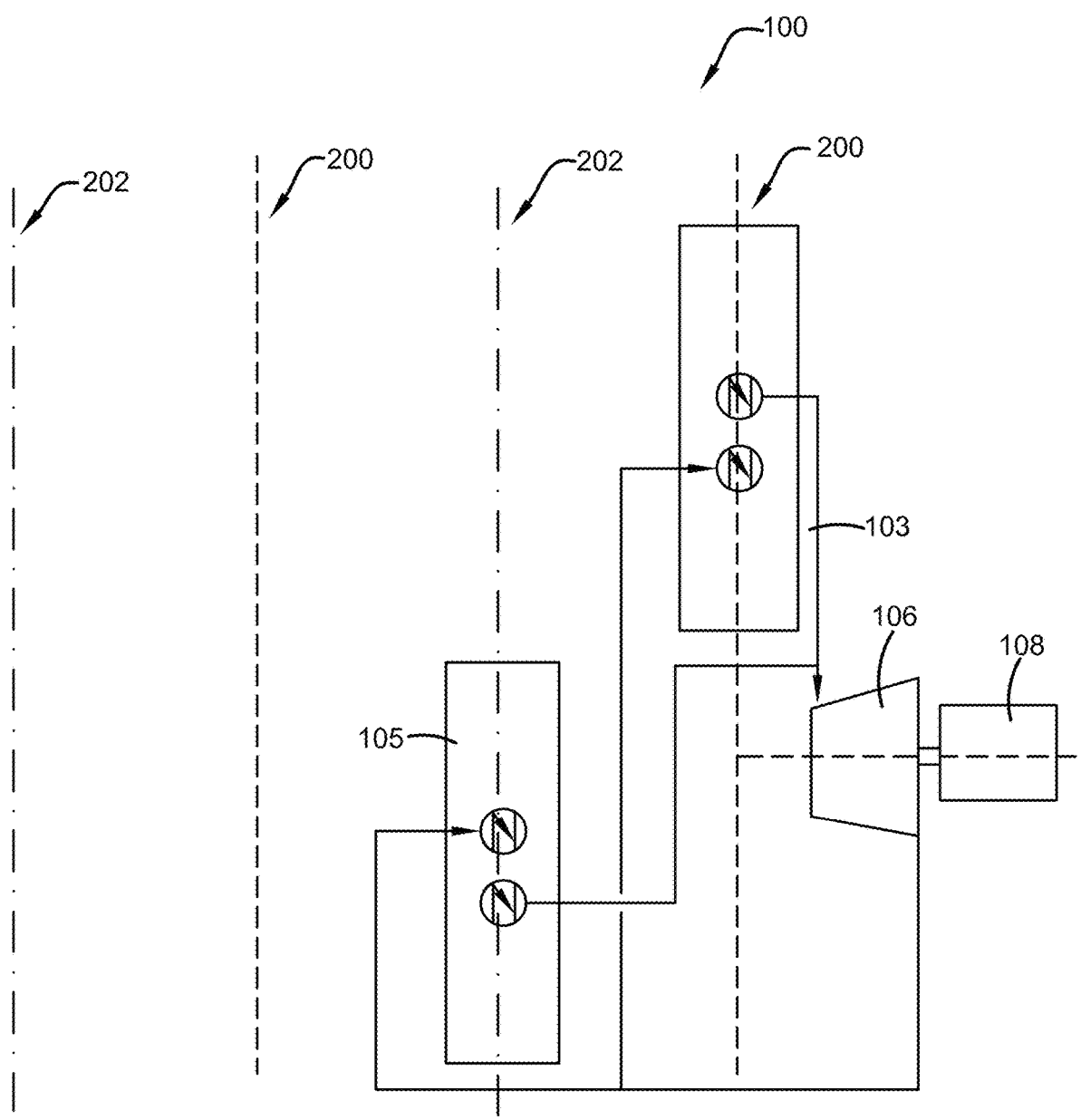
FIG. 4 illustrates a diagram of the wave power device of the present invention showing wave progression over the wave collection tubes in accordance with the disclosed architecture.

FIG. 4 is a diagram of the wave progression. Specifically, as the wave progresses, its crest 200 advances over the first wave collection tube 103, entering the tube's underside and forcing the air within it out the upper side, through the non-return valve 118, and to the turbine's high-pressure inlet 122. At the same time, its trough 202 advances over the second wave collection tube 105, withdrawing the water from the tube's underside and creating a suction that pulls air from the turbine's low-pressure outlet 124, through the non-return valve 118, and into the air into the upper side. As the wave continues to progress, the process reverses, with air being drawn into the first wave collection tube 103 and being forced out of the second wave collection tube 105. Successive waves continue this push-pull process, creating an alternating current of airflow. This flow is passed through a rectifier 104, creating a linear flow through two pipes, one leading into a turbine 106 and the other removing air from the turbine 106. The linear flow through the turbine 106, in turn, rotates the generator 108 to produce electricity. In this figure, the first 103 and second 105 wave collection tubes are offset by one half of a wavelength.

Figure 5:
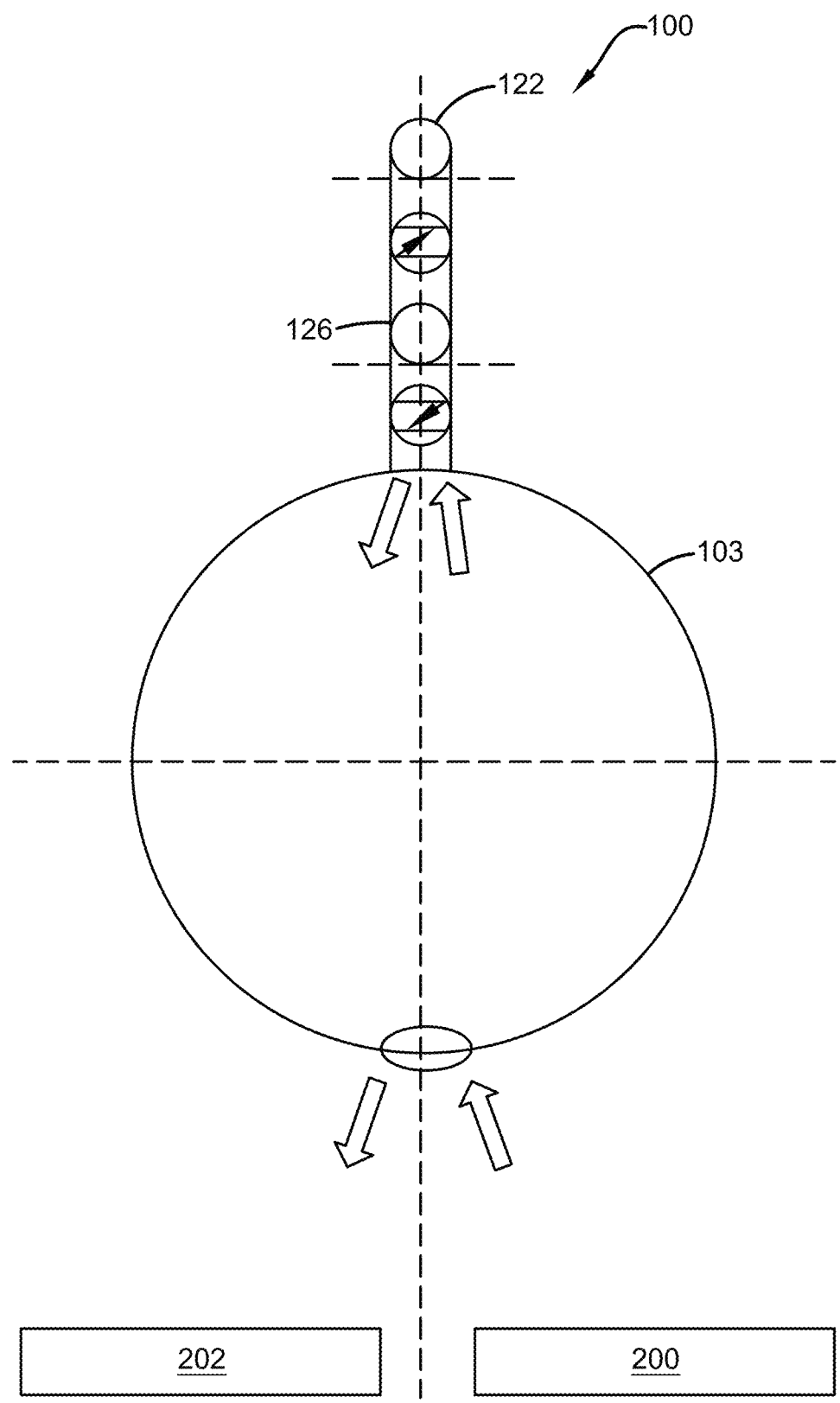
FIG. 5 illustrates a diagram of the wave power device of the present invention showing an end view of one of the wave collection tubes in use in accordance with the disclosed architecture.

FIG. 5 is a diagram of the end view of the first wave collection tube 103. In the wave crest phase 200, water holes connect the first wave collection tube 103 to the ocean. Water goes in the first wave collection tube 103. Specifically, the oncoming wave crest 200 enters the bottom of the first wave collection tube 103, forcing the air in the tube out the top. Then, air goes out of the first wave collection tube 103. Specifically, the air in the first wave collection tube 103 is forced by the in-rushing wave water from the wave crest 200 out the top of the tube 103 and through the air pipe and to the turbine 106. Further, the air output pipe connects the first wave collection tube 103 to the turbine's high-pressure side 122.

In the water trough phase 202, water goes out of the first wave collection tube 103. Specifically, the water is withdrawn from the first wave collection tube 103 into the trough 202 of the oncoming wave, sucking the air from the rectifier 104 into the tube. Then, air enters into the first wave collection tube 103. Specifically, the air is drawn from the turbine 106 through the air pipe into the first wave collection tube 103 by the suction created by the exit of the wave water through the tube's bottom into the trough 202 of the wave. Further, an air input pipe connects the first wave collection tube 103 to the turbine's low-pressure side 126.

Figure 6:
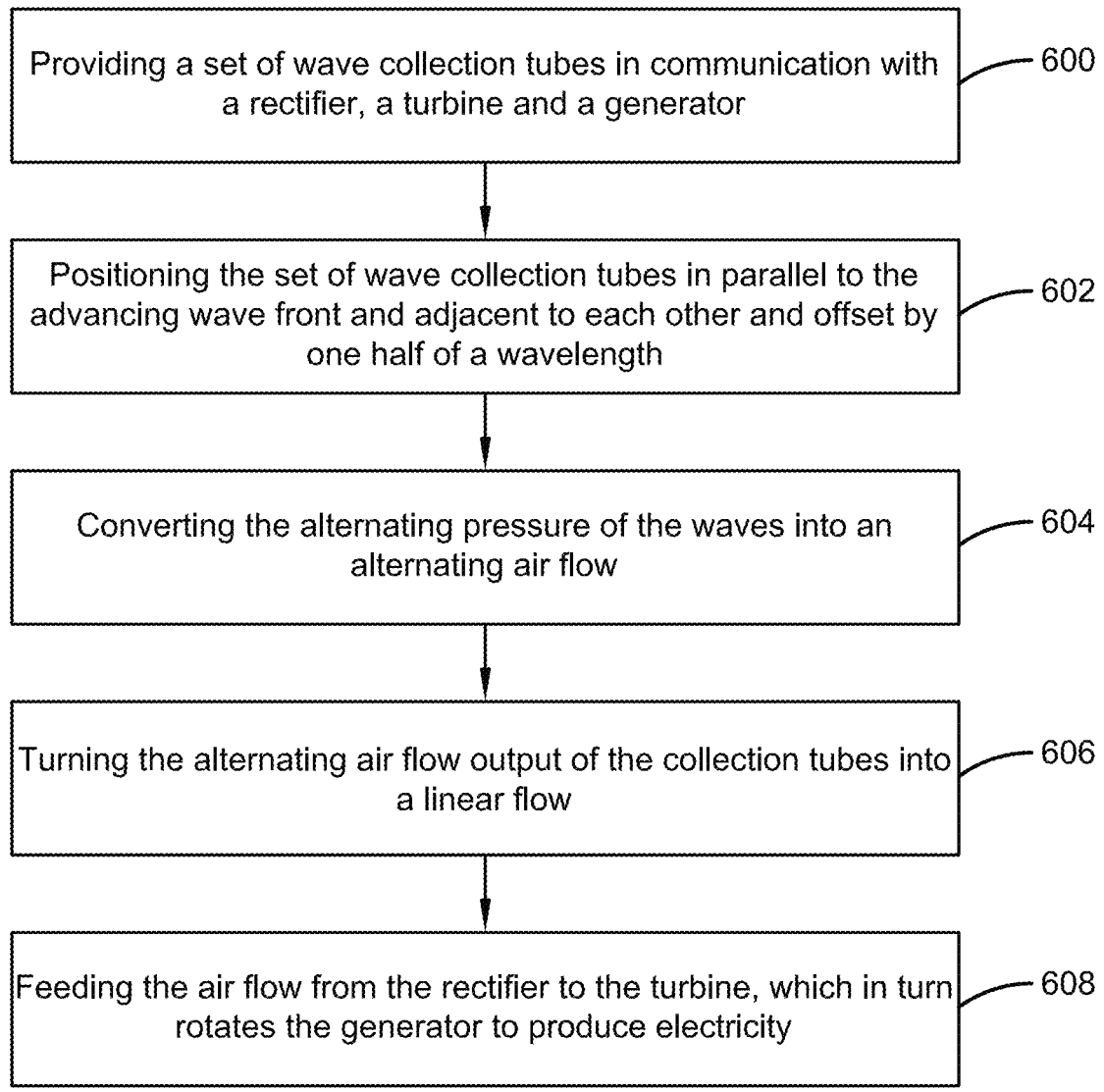
FIG. 6 illustrates a flowchart showing the method of extracting power from water waves and converting it into clean renewable electricity in accordance with the disclosed architecture.

FIG. 6 illustrates a flowchart of the method of extracting power from water waves and converting it into clean renewable electricity. The method includes the steps of at 600, providing a set of wave collection tubes in communication with a rectifier, a turbine, and a generator. The method also comprises at 602, positioning the set of wave collection tubes in parallel to the advancing wave front and adjacent to each other and offset by one half of a wavelength. Further, the method comprises at 604, converting the alternating pressure of the waves into an alternating airflow. The method also comprises at 606, turning the alternating airflow output of the collection tubes into a linear flow. Finally, the method comprises at 608, feeding the airflow from the rectifier to the turbine, which in turn rotates the generator to produce electricity.

Certain terms are used throughout the following description and claims to refer to particular features or components. As one skilled in the art will appreciate, different users may refer to the same feature or component by different names. This document does not intend to distinguish between components or features that differ in name but not structure or function. As used herein "wave power device", "wave device", "power device", and "device" are interchangeable and refer to the wave power device 100 of the present invention.

Notwithstanding the foregoing, the wave power device 100 of the present invention can be of any suitable size and configuration as is known in the art without affecting the overall concept of the invention, provided that it accomplishes the above-stated objectives. One of ordinary skill in the art will appreciate that the wave power device 100 as shown in FIGS. 1-6 is for illustrative purposes only, and that many other sizes and shapes of the wave power device 100 are well within the scope of the present disclosure. Although the dimensions of the wave power device 100 are important design parameters for user convenience, the wave power device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A wave power device that provides a user with a system for extracting power from water waves and converting it into electricity, the wave power device comprising:
    a set of wave collection tubes each comprising an impact absorber;
    a weight attachable to a lowest point of each of the wave collection tubes via a tether chain that is adjustable in depth via a winch;
    a rectifier;
    a turbine; and
    a generator;
    wherein the set of wave collection tubes are placed in parallel to advancing wave front and adjacent to each other;
    wherein one of the set of wave collection tubes is closely adjacent a wave crest, while another of the set of wave collection tubes is closely adjacent a wave trough;
    wherein alternating pressure of water waves within the set of wave collection tubes, is converted into an alternating airflow;
    wherein rectifier turns the alternating airflow output of the set of wave collection tubes into linear flow; and
    wherein airflow from the rectifier is fed to the turbine, which in turn, rotates the generator to produce electricity;
    wherein the turbine comprises a high-pressure inlet for accepting airflow from the rectifier and a low-pressure outlet for expelling the air back to the rectifier; and
    wherein a linear output from a high-pressure side of the rectifier is piped to the high-pressure inlet of the turbine, and after passing through the turbine, the air will be piped to a low-pressure side of the rectifier.

2. The wave power device of claim 1, wherein the set of wave collection tubes comprises a first wave collection tube and a second wave collection tube.

3. The wave power device of claim 1, wherein the set of wave collection tubes are partially or totally immersed in water and are weighted and balanced to remain horizontal in the water.

4. The wave power device of claim 3, wherein the set of wave collection tubes are completely immersed in water and are weighted and balanced to remain horizontal in the water.

5. The wave power device of claim 4, wherein the set of wave collection tubes are typically cylindrical in shape, with an exterior surface closed front and rear ends, and an open interior accessed by holes along the bottom, which permits influx and egress of water.

6. The wave power device of claim 5, wherein the set of wave collection tubes are offset by one half of a wavelength.

7. The wave power device of claim 6, wherein each of the set of the wave collection tube's diameter is matched to a maximum expected wave amplitude.

8. The wave power device of claim 7, wherein each of the set of the wave collection tube's length is 100 meters or more.

9. The wave power device of claim 8, wherein the rectifier comprises a plurality of check valves that turn the alternating airflow output of the set of wave collection tubes into linear flow.

10. A method of wave progression over first and second wave collection tubes, the method comprising the following steps:
    advancing a wave crest over the first wave collection tube;
    forcing air from the first wave collection tube into a rectifier;
    advancing a wave trough over the second wave collection tube;
    pulling the air from the rectifier into the second wave collection tube;
    converting sinusoidal motion (alternating current) of the wave into a rectified sine wave motion via the rectifier;
    refining that motion into linear motion (direct current); and
    passing the flow through a turbine to drive a turbine's shaft, which in turn rotates a generator to produce electricity; and wherein the first and second wave collection tubes each comprise an impact absorber;

wherein the turbine comprises a high-pressure inlet for accepting airflow from a rectifier and a low-pressure outlet for expelling the air back to the rectifier; and wherein a linear output from a high-pressure side of a rectifier is piped to the high-pressure inlet of the turbine, and after passing through the turbine, the air will be piped to a low-pressure side of the rectifier.

11. The method of claim 10, wherein the wave's crest is advancing over the second wave collection tube and the wave's trough is advancing over the first wave collection tube.

12. The method of claim 11 further comprising as wave crest is advancing over the second wave collection tube, forcing air from the second wave collection tube into the rectifier; and as wave trough is advancing over the first wave collection tube, pulling the air from the rectifier into the first wave collection tube.

13. A method of extracting power from water waves and converting it into clean renewable electricity, the method comprising the following steps:

provviding a set of wave collection tubes in communication with a rectifier, a turbine, and a generator;

converting the alternating pressure of the waves into an alternating airflow;

turning the alternating airflow output of the collection tubes into a linear flow; and feeding the airflow from the rectifier to the turbine, which in turn rotates the generator to produce electricity; and wherein the set of wave collection tubes each comprise an impact absorber;

wherein the turbine comprises a high-pressure inlet for accepting airflow from the rectifier and a low-pressure outlet for expelling the air back to the rectifier; and wherein a linear output from a high-pressure side of a rectifier is piped to the high-pressure inlet of the turbine, and after passing through the turbine, the air will be piped to a low-pressure side of the rectifier.

* * * * *